United States Patent
Harris et al.

(10) Patent No.: US 9,712,541 B1
(45) Date of Patent: Jul. 18, 2017

(54) HOST-TO-HOST COMMUNICATION IN A MULTILEVEL SECURE NETWORK

(71) Applicant: The Boeing Company, Seal Beach, CA (US)

(72) Inventors: Brian R. Harris, St. Charles, MO (US); William E. Bond, St. Louis, MO (US); Gregory D. Stewart, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 512 days.

(21) Appl. No.: 13/969,741

(22) Filed: Aug. 19, 2013

(51) Int. Cl.
    *H04L 29/06* (2006.01)

(52) U.S. Cl.
    CPC .......... *H04L 63/108* (2013.01); *H04L 63/105* (2013.01); *H04L 63/107* (2013.01); *G06F 2221/2113* (2013.01)

(58) Field of Classification Search
None
See application file for complete search history.

(56) References Cited

U.S. PATENT DOCUMENTS

| | | |
|---|---|---|
| 7,076,803 B2 | 7/2006 | Bruton, III et al. |
| 7,441,119 B2 | 10/2008 | Brabson et al. |
| 7,607,011 B1 | 10/2009 | Johnson et al. |
| 7,681,036 B1 | 3/2010 | Zuber et al. |
| 7,779,254 B1 | 8/2010 | Crosmer et al. |
| 7,991,008 B2 | 8/2011 | Winter |
| 8,132,004 B2 | 3/2012 | Price |
| 2003/0105953 A1 | 6/2003 | Brabson et al. |
| 2003/0105979 A1 | 6/2003 | Itoh et al. |
| 2004/0199808 A1* | 10/2004 | Freimuth et al. ................. 714/4 |

(Continued)

FOREIGN PATENT DOCUMENTS

GB     2472726 A     12/2009

OTHER PUBLICATIONS

Bolstad, "High-Performance Ethernet Fabrics for Military Systems," Copyright 2009, COTS Journal, 5 pages.

(Continued)

*Primary Examiner* — Hadi Armouche
*Assistant Examiner* — Andrew Steinle
(74) *Attorney, Agent, or Firm* — Womble Carlyle Sandridge & Rice LLP (57) ABSTRACT

A network communication system includes a plurality of computer systems each of which may operate in accordance with at least one protocol stack assigned to a security level of a multilevel security model. The computer system may perform address discovery or registration for network-layer address(es) with a network for an exchange of data between hosts provided by protocol stacks at respective security levels of the multilevel security model. And the computer system may exchange data between the hosts, with the data being accessible or inaccessible by the hosts according to the respective security levels and mandatory access control information flow policy/policies consistent with the multilevel security model. The address discovery or registration, on the other hand, may be performed using a network management protocol that is trusted and accessible by the hosts without regard to the respective security levels and mandatory access control information flow policy/policies.

15 Claims, 7 Drawing Sheets

(56) References Cited

U.S. PATENT DOCUMENTS

| | | |
|---|---|---|
| 2005/0283601 A1* | 12/2005 | Tahan ............................. 713/2 |
| 2006/0168043 A1* | 7/2006 | Eisenberger .......... G06F 19/326 709/206 |
| 2007/0127417 A1 | 6/2007 | Kalika |
| 2008/0008205 A1 | 1/2008 | Jung et al. |
| 2008/0141333 A1 | 6/2008 | Chen et al. |
| 2009/0052448 A1* | 2/2009 | Ramakrishnan et al. .... 370/390 |
| 2009/0319787 A1 | 12/2009 | Price |
| 2009/0323682 A1 | 12/2009 | Winter |
| 2011/0154438 A1* | 6/2011 | Price ................................. 726/3 |
| 2012/0036187 A1* | 2/2012 | Luboshitz et al. ............ 709/204 |
| 2012/0075062 A1* | 3/2012 | Osman et al. ............... 340/5.61 |
| 2012/0324222 A1 | 12/2012 | Massey et al. |

OTHER PUBLICATIONS

Combined Search and Examination Report of UK Application No. GB1210742.1; Dec. 5, 2012; 5 pages.

De Jong, "Open Standards Ease Multi-Level Security (MLS) Systems Integration," Copyright 2011, 8 pages.

United States Patent and Trademark Office, Office Action for U.S. Appl. No. 12/137,668 dated Jan. 14, 2011, 16 pages, US.

United States Patent and Trademark Office, Office Action for U.S. Appl. No. 12/137,668 dated Jun. 17, 2011, 12 pages, US.

\* cited by examiner

HOST-TO-HOST COMMUNICATION IN A MULTILEVEL SECURE NETWORK

TECHNOLOGICAL FIELD

The present disclosure relates generally to network communication and, in particular, to host-to-host communication in a multilevel secure network.

BACKGROUND

Multilevel security or multiple levels of security (MLS) is the application of a computer system to process information with different security levels, permit access by hosts with different security clearances and needs-to-know, and prevent hosts from obtaining access to information for which they lack authorization.

MLS systems often implement mandatory access control (MAC) to manage access to information within the system. Mandatory access control refers to a type of access control by which the system constrains the ability of a subject or initiator to access or generally perform some sort of operation on an object or target. Whenever a subject attempts to access an object, an authorization rule enforced by the system examines these security attributes and decides whether the access can take place. Any operation by any subject on any object will be tested against the set of authorization rules (or policy) to determine if the operation is allowed.

Although a number of suitable systems and methods have been developed to implement a MLS solution, it is generally desirable to develop improved systems and methods.

BRIEF SUMMARY

Example implementations of the present disclosure are generally directed to an improved system for host-to-host communication in a multilevel secure network. According to one aspect, a network communication system is provided that includes a plurality of computer systems each of which is configured to operate in accordance with at least one protocol stack assigned to a security level of a multilevel security model. The computer system may be configured to perform address discovery or registration for one or more network-layer addresses with a network for an exchange of data between hosts provided by protocol stacks at respective security levels of the multilevel security model. And the computer system may be configured to exchange data between the hosts, with the data being accessible or inaccessible by the hosts according to the respective security levels and one or more mandatory access control information flow policies consistent with the multilevel security model. The address discovery or registration, on the other hand, may be performed using a network management protocol that is trusted and accessible by the hosts without regard to the respective security levels and one or more mandatory access control information flow policies.

In some examples, the computer system may be configured to receive a domain identifier, logical-partition identifiers and topic identifiers for respective ones of a domain, logical partitions of the domain and topics of data for communication in the network. Each of the logical partitions may be assigned to a respective security level of the multilevel security model. In these examples, the computer system may also be configured to generate one or more multicast addresses each of which includes the domain identifier and a unique combination of logical-partition identifier and topic identifier. And the computer system may be configured to register the one or more multicast addresses with the network.

In some examples, protocol stacks of the computer systems are configured to provide respective ones of a first host at a first security level, a second host at a second security level that is lower than the first security level, and one of the computer systems is configured to function as a cross-domain solution (CDS). In these examples, the first host may be configured to publish to the network, data on a given topic that is subscribed to by the second host, with the data at the first security level being inaccessible by the second host according to the multilevel security model. The CDS may be subscribed to the data as a proxy for the second host. The CDS may therefore be configured to filter the data to produce filtered data at the second security level, and republish the filtered data to the network for receipt by the second host. Also in these examples, the data may be published to the network or filtered data republished to the network using the generated one or more multicast addresses.

In some further examples, the first host may be configured to publish the data using a multicast address that includes the domain identifier, logical-partition identifier assigned to the first security level, and topic identifier assigned to the given topic. The CDS, then, may be configured to republish the filtered data using a multicast address that includes the domain identifier, logical-partition identifier assigned to the second security level, and topic identifier assigned to the given topic.

In some further examples, the CDS may be configured to return an acknowledgement to the first host in response to the CDS receiving the data, and receive an acknowledgement from the second host at the CDS in response to the second host receiving the filtered data.

In some examples, protocol stacks of the computer systems are configured to provide respective ones of a second host at a second security level, and a first host at a first security level that is equal to or higher than the second security level. In these examples, the second host may be configured to publish to the network, data on a given topic that is subscribed to by the first host, with the data at the second security level being accessible by the first host according to the multilevel security model.

In some further examples, the second host may be configured to publish the data using a multicast address that includes the domain identifier, logical-partition identifier assigned to the second security level, and topic identifier assigned to the given topic.

In some examples, protocol stacks of the computer systems are configured to provide respective ones of a first host at a first security level, a second host at a second security level that is lower than the first security level, and one of the computer systems is configured to function as a CDS. In these examples, the first host may be configured to publish to the network, an acknowledgement in response to the first host receiving data on a given topic published to the network by the second host, with the acknowledgement at the first security level being inaccessible by the second host according to the multilevel security model. Similar to above, the CDS may be subscribed to the acknowledgement as a proxy for the second host. Thus, the CDS may be configured to filter the acknowledgement to produce a filtered acknowledgement at the second security level, and republish the filtered acknowledgement to the network for receipt by the second host. And similar to before, the acknowledgement may be published to the network or filtered acknowledgement republished to the network using the generated one or more multicast addresses.

In some further examples, the first host may be configured to publish the acknowledgement using a multicast address that includes the domain identifier, logical-partition identifier assigned to the first security level, and topic identifier assigned to the acknowledgement And the CDS may be configured to republish the filtered acknowledgement using a multicast address that includes the domain identifier, logical-partition identifier assigned to the second security level, and topic identifier assigned to the acknowledgement.

In other aspects of example implementations, an apparatus and method are provided for host-to-host communication in a multilevel secure network. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Also, something may be shown or described as being above something else (unless otherwise indicated) may instead be below, and vice versa; and similarly, something shown or described as being to the left of something else may instead be to the right, and vice versa. Like reference numerals refer to like elements throughout.

Figure 1:
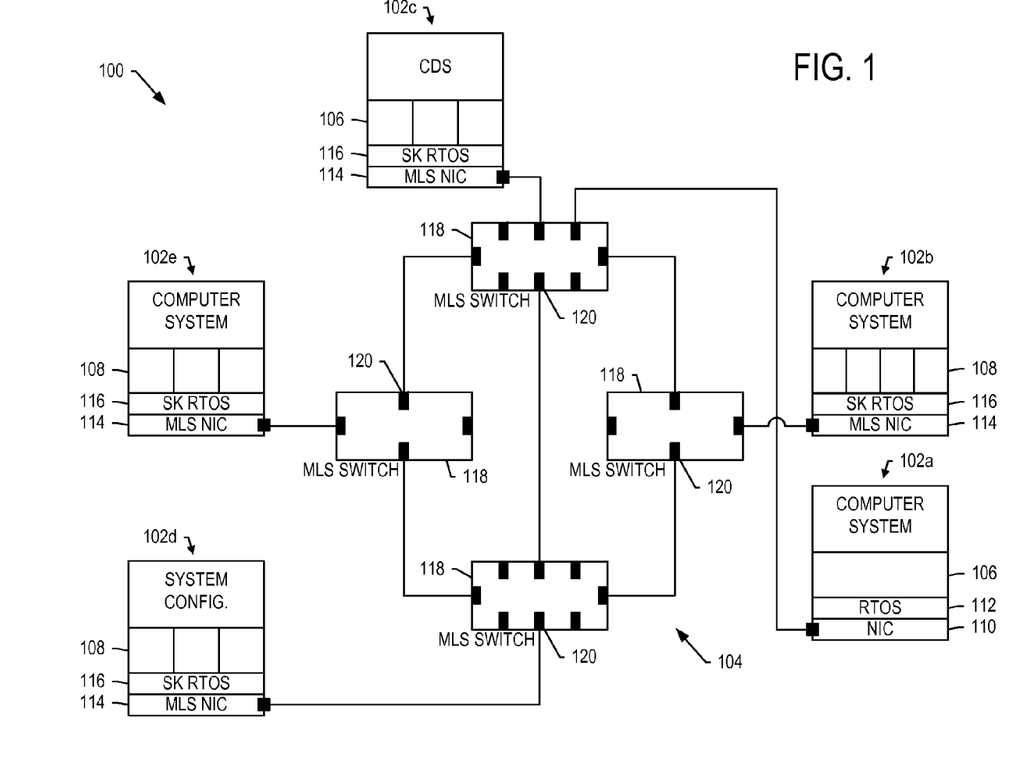
FIG. 1 is an illustration of a network-communication system in accordance with an example implementation.

Referring now to FIG. 1, a network-communication system 100 is illustrated according to example implementations of the present disclosure. In accordance with example implementations, the network-communication system may be configured to implement a multilevel security (MLS) model. The network-communication system may employ one or more separation mechanisms (e.g., separation kernel, separation communication system, physical separation) to maintain highly-assured (trusted) data and process separation.

The network-communication system 100 may include any of a number of different subsystems (each an individual system) for performing one or more functions or operations. In some examples, the network-communication system may support enforcement of one or more application/system specific security policies according to various security levels of a multilevel security model including a plurality of security levels, such as the Bell-LaPadula security model. The security levels may increase from a lowest, least-secure level (e.g., unclassified) to a highest, most-secure level (e.g., top secret), and may include one or more intermediate levels of increased security therebetween (e.g., confidential, secret). In some examples, the security level may have increased granularity and include a combination of security level and one or more categories, such as in the case of the Federal Information Processing Standards Publications (FIPS PUBS) No. 188, *Standard Security Label for Information Transfer*. The network-communication system may therefore facilitate and support sharing secured information between its various subsystems according to these security levels.

Although shown in a particular number and configuration of computer systems and switches (or other network components), it should be understood that the network-communication system 100 may include any number of different computer systems and switches, and may be arranged in any of a number of different manners. It should also be understood that one or more subsystems (e.g., computer systems, switches, system configurator) may function or operate as a separate system without regard to others of the subsystems. And even further, it should be understood that the network-communication system may include one or more additional or alternative subsystems than those shown in FIG. 1.

As shown, the system may include a plurality of computer systems 102 that may be directly or indirectly interconnected by a network 104. Five example computer systems are shown as 102a, 102b, 102c, 102d and 102e, although any one or more of the computer systems may be generally referred to as a computer system 102. In some examples, the computer system may operate in accordance with a protocol stack, such as that provided by or similar to the generic Open Systems Interconnection (OSI) model, TCP/IP model or the like. The stack may include one or more user applications (software applications) that may be executed by a processor, and each user application may be configured to provide one or more services.

Each of the computer systems 102 may be a single-level (SL) computer system or a multi-level security (MLS) computer system. A SL computer system such as computer system 102a may support only a single-level security and implement a single protocol stack 106 assigned to a single level of a plurality of security levels, such as according to the Bell-LaPadula security model. A MLS computer system such as computer system 102b, 102c, 102d, 102e may include an appropriate separation kernel (SK) configured to enable multi-level security by enforcing separation of security levels. The SK may partition the protocol stack into multiple MILS partitions 108 each of which may be assigned to a security level of the plurality of security levels, and each of which may implement a respective protocol stack.

In some examples, a computer system 102 or more particularly a user application of a computer system may be at times referred to as a "host" or "node" that may offer resources, services and applications to users or other hosts/nodes on the network 104. A host of a SL computer system may at times be referred to as a "SL host," while a host of a MLS computer system may at times be referred to as a "MLS host," although either may generally be referred to as a "host."

The SK may be implemented in a number of different manners. In one example, the SK may be implemented by an operating system such as a real-time operating system (RTOS). Each computer system 102 may include a network interface card (NIC) (e.g., network interfaces) to connect the computer system to the network 104. The RTOS may bridge between various software and hardware levels of the computer system's protocol stack, and may also implement the SK to bridge between the MLS partitions and MLS NIC. A SL computer system 102a may therefore include a NIC 110 and RTOS 112, while a MLS computer system including multiple MILS partitions 108 may include a high-assurance (trusted), MLS NIC 114 and SK RTOS 116.

In some examples, the MLS NIC 110 and perhaps trusted components of the network 104 (e.g., switches) may be configured to forward data between the computer system 102 and network, and forward data on the network. Each of at least some of the hosts (computer system or user application of a computer system) of the network-communication system 100 may be assigned a security level of the plurality of security levels. And data may then be forwarded according to security policies applied based on security levels of the source and destination hosts, where in some examples the security level of the host may be reflected in a label applied to the data. In some examples, the computer system may include one or more MLS NICs to support its MILS partitions. This may enable blocking those access and information queries that are unauthorized, dependent on the level of security implemented on a per-stack basis.

One example of a suitable MLS NIC 110 according to example implementations of the present disclosure is disclosed in U.S. Patent Application Publication No. 2012/0324222, entitled: *Multiple Independent Levels of Security (MILS) Host to Multilevel Secure (MLS) Offload Communications Unit*, published on Dec. 20, 2012, the content of which is incorporated by reference in its entirety.

The network 104 may include various means such as more switches, routers, gateways, access points or the like. As shown, the network may include one or more high-assurance, MLS switches 116 (e.g., Ethernet switches) configured to connect the computer systems 102 or links between such systems formed by one or more switches. The switches may include one or more ports 120 configured to connect the computer systems and links (only select ones of which are separately called out in FIG. 1). The switches may forward data between computer systems and the switches themselves, and although not separately shown, each may include an appropriate controller for controlling its operation.

A security model such as the Bell-LaPadula security model may permit intra-level access in which a host may access data at the same security level with which the host is associated. The security model may also permit certain inter-level access in which the host may access data at a lower security level than the security level with which the host is associated. Generally although not without exception, the security model may prohibit inter-level access in which the host may be prevented from accessing data at a higher security level than the security level with which the host is associated.

The MLS NIC 110 may enforce a mandatory access control (MAC) information flow policy on data inbound to a MLS host of a MLS computer system 102b, 102c, 102d, 102e. Similarly, the MLS switch 118 may enforce a MAC information flow policy throughout the network 104 and with SL and MLS hosts of SL and MLS computer systems.

In some examples, the separation of multiple levels of data may be achieved using a high-assurance (trusted) data labeling strategy, which in some examples may use a labeling structure and implement and evaluate labeling on a frame-by-frame basis at the data link layer, and/or on a packet-by-packet basis at the network layer. An authentication header with integrity check value (ICV) may be used to bind the label to the data.

The MLS NIC 110 may implement a labeling function of data generated by a user (egress data), and/or a labeling evaluation function of data intended to be consumed by a user (ingress). In some examples, the MLS NIC may label egress data of a user to represent the security level of the respective user in order that the data can be evaluated by another MLS NIC or MLS switch 118 for acceptability of ingress to other users. The MLS NIC may evaluate ingress data to a user to determine if the data security label is within the allowable range for consumption by the respective user, and may remove its label before passing the data.

The MLS switch 118 may function in a manner similar to the MLS NIC 110. The MLS switch may implement a labeling and labeling evaluation function on ingress and egress data. In some examples, a MLS switch adjacent to a MLS host may only evaluate policy as data is flowing through (the data being labeled by the MLS NIC), and may at times be referred to as an "intermediate" MLS switch. On the other hand, in some examples, a MLS switch adjacent to a SL host may insert (ingress) and/or remove labels (egress) instead of the MLS NIC, and may at times be referred to as an "end-system" MLS switch.

As also shown in FIG. 1, one of the computer systems 102 (e.g., computer system 102c) may be configured to function as a cross-domain solution (CDS). This computer system may include an appropriate, high-assurance CDS filter engine that may enforce a MAC information flow policy on the authorized communication of data between security levels, such as on the authorized write-down/downgrade of data. In some examples, the security policy for the filter engine may use a white-list strategy; that is, messages received at the filter may be compared against preconfigured information for authorized transfers (filter rules). The security policy may be mandatory for all messages received with unauthorized messages being discarded, and may be implemented to maintain security-level separation in the network 104.

Further, one of the computer systems 102 (e.g., computer system 102d) may be configured to function as a system configurator. This computer system may act as the director for the network 104 to maintain the security infrastructure. A subset of its functions may include security supporting, namely, the loading of MLS NIC 110 and MLS switch 118 security policy data, CDS configuration data and filter rules, and monitoring system audit logs for critical events and responding, as necessary.

Figure 2:
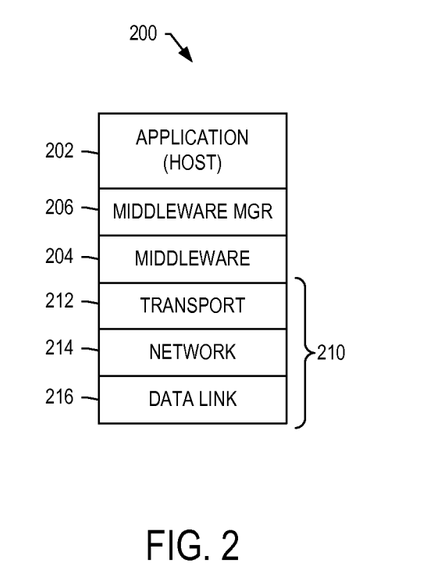
FIG. 2 illustrates a protocol stack of a computer system according to example implementations of the present disclosure.

FIG. 2 illustrates a suitable protocol stack 200 of a computer system (e.g., computer system 102) according to example implementations of the present disclosure, and at least a portion of which may in some examples correspond to stack 106 or partition 108. As shown, the stack 200 may include one or more user applications 202 (hosts) each of which may be configured to provide one or more services. A user application may be configured to communicate with one or more external systems (e.g., other computer systems) via middleware 206, which may be configurable by an appropriate middleware manager 208. And the user application may communicate via other, lower layers 210 such as a transport layer 212, network layer 214, data link layer 216 and the like. In some examples, the protocol stack may further include a physical layer that may be provided by a NIC (e.g., MLS NIC 110), and at least some of the lower layers may be offloaded to the NIC.

Returning now to FIG. 1, hosts on computer systems 102 may transmit, receive or otherwise exchange (generally "exchange") data in accordance with any of a number of different techniques. In some examples, the middleware (e.g., middleware 206) of a stack 106 or partition 108 may provide a suitable service for the exchange of data. One example of a suitable service is the Data Distribution Service for Real-Time System (DDS), which is an Object Management Group (OMG) machine-to-machine middleware standard used in connection with distributed applications such as in the case of the network-communication system 100. One of the DDS specifications published by OMG standardizes the software application programming interface (API) by which a distributed user application may asynchronously exchange information based on a publish-subscribe model. In some examples, DDS may be utilized as the interface for a host in a stack on a computer system. And in some examples, DDS may also be utilized to provide proxy functionality such as in the context of a CDS (e.g., computer system 102c) between security levels.

Aspects of example implementations may be described in the context of DDS and using DDS terminology. But it should be understood that DDS is only one example of a manner by which hosts may communicate with one another across the network 104 according to example implementations, and DDS terminology is used without loss of generality. In this context, hosts producing data may be at times known as "publishers" and those consuming data may be at times known as "subscribers."

A "domain" may refer to a logical, isolated (DDS) network including at least one publisher and one or more subscribers, and may be used to isolate (DDS) communication in one group from that in another group. A domain may be divided into logical subdivisions referred to as "logical partitions" (not to be confused with MILS partitions), which may be used to organize and segregate communication within a domain. A "topic" may refer to a type of data of a plurality of types of data that may be exchanged between a publisher and subscriber(s), and may be one example of a manner by which logical partitions may organize and segregate communication within a domain.

In accordance with example implementations, the network-communication system 100 may be one of one or more network-communication systems each of which may be assigned a respective domain (logical network). Each domain may include a plurality of logical partitions each of which may be assigned a respective security level of a plurality of security levels. Each domain may have a unique identifier (ID)—name or alphabetic, numeric or alphanumeric ID. Similarly, each logical partition may have a unique ID. And each of a plurality of predefined topics may have a unique ID or may be grouped into one or more groups of topics each of which may have a unique ID (generally described as a topic ID). In one example, one or more IDs such as one or more topic IDs (e.g., topic ID=0) may be reserved for internal bookkeeping functions.

Also in accordance with example implementations, the network-communication system 100 may be configured to include a plurality of network partitions each of which may be associated with a unique combination of logical partition (assigned a respective security level) and topic within a domain. Each network partition may be assigned one or more network-layer addresses such as one or more unicast addresses, one or more multicast addresses, a broadcast address or the like.

A multicast address may include, for example, a domain ID, logical-partition ID and topic ID. Similar to its logical partition, then, a network partition may be associated with a security level, which may be indirectly identified through the domain ID in its multicast address. An example of an IPv6 multicast address may be as follows:

| ff32::0dd5: | 96 | 00:01 | 01 |
|---|---|---|---|
| Prefix | Domain ID | Partition ID | Topic ID |

A similar example of an IPv4 multicast address may be as follows:

| 239 | 150 | 1 | 1 |
|---|---|---|---|
| Prefix | Domain ID | Partition ID | Topic ID |

In the preceding, the prefix includes a value (e.g., ff32::0dd5, 239) understood by switches 106 as denoting a multicast address. The domain ID may be multi-bit value that identifies a particular domain, and the logical-partition ID may be a multi-bit value that identifies a particular logical partition within the respective, particular domain. And the topic ID may be a multi-bit value that identifies a particular topic or group of topics within the particular logical partition of the particular domain.

In some examples, the network-communication system 100 may be initialized at startup by the system configurator (e.g., computer system 102d). At startup, the system configurator may initialize each of a number of hosts of respective stacks 106 or partitions 108 of a computer system 102 (or in some examples their middleware) with one or more unicast addresses. In addition to or in lieu of unicast addresses, the system configurator (e.g., computer system 102d) may initialize each of the number of hosts with the IDs of the domain and logical partitions of the domain (including the logical-partition ID of respective hosts), and from which one or more multicast addresses may be generated. In some examples, the logical partitions may be ordered according to their assigned security levels, such as from the lowest, least-secure level to the highest, most-secure level (or vice versa). In one example in the context of the stack 200 of FIG. 2, this may be accomplished by the system configurator providing the respective unicast addresses and/or IDs to the middleware manager 206 for configuration of the middleware 204.

In the above multicast context in particular, the hosts may also be initialized at startup with topic IDs of topics on which the respective hosts support communication (and perhaps also a topic ID reserved for bookkeeping). For example, topic IDs may include those of topics on which a host may publish data, and those on which a host may subscribe to data. In some examples, the host may be configured to provide more than one service, and each service may be configured to support communication on one or more topics. In these examples, the host may be initialized at startup with topic IDs (publish/subscribe) for each of the services that the host provides. Again, this may be accomplished through configuration of the middleware 204 through its manager 206.

In some examples in the context of either unicast, multicast (or even broadcast), each host may be initialized at startup with a particular quality-of-service (QoS) profile for the service(s) of its host(s), or for each topic of the respective service(s). The QoS profile may indicate best-effort communication in which a publisher that communicates with a subscriber does not expect or require acknowledgement of receipt of its communication or receipt at any particular QoS level. Or in another example, the QoS profile may indicate reliable communication in which the publisher does expect or require acknowledgement.

The stacks 106 or partitions 108 of the computer systems 102 (or in some examples its middleware 204 or middleware manager 206) may discover the unicast addresses of one another, as well as MLS switches 118 in the network 104. This discovery may be accomplished, for example, by the exchange of appropriate discovery messages between the stacks/partitions and switches. Each stack/partition may also generate one or more multicast addresses identifying its domain, logical partition and topics, and may register the multicast addresses with the network. This registration may be accomplished, for example, by the stack/partition registering multicast addresses with its local MLS switch, which may in turn communicate with other MLS switches throughout the domain to build distribution trees for respective multicast groups. And in various examples, the unicast address discovery, multicast address registration and other network management functions may be performed using an appropriate network management protocol such as Internet Control Message Protocol (ICMP) version 4 (ICMPv4), version 6 (ICMPv6), Internet Group Management Protocol (IGMP) or the like. This protocol may be trusted within the network-communication system 100, and may thereby permit hosts to access its packets without regard to their security levels or MAC information flow policies. Other packets such as those at the transport layer (e.g., User Datagram Protocol—UDP, Transmission Control Protocol—TCP), may only be accessible in accordance with their security levels and MAC information flow policies.

After startup and initialization of the network-communication system 100, the computer systems 102 and their respective stacks 106 and partitions 108 including respective hosts may use the multicast addresses and respective groups to exchange data. That is, a publisher may publish topic data (transport-layer protocol—e.g., UDP) using an appropriate unicast address, multicast address including the publisher's domain ID, partition ID and the respective topic ID, or broadcast address. The MLS NICs 110 and MLS switches 118 may forward the topic data to subscribers of the respective topic, their security levels and one or more MAC information flow policies. FIGS. 3, 4, 5 and 6 illustrate example scenarios of the flow of data for various QoS profiles according to example implementations of the present disclosure. Each figure illustrates the flow of data from one stack or partition to another, although in each, only a portion of the respective stacks/partitions is illustrated. The examples below may be particularly described in the context of multicast, but it should be understood that the examples may equally apply in the context of unicast or broadcast.

Figure 3:
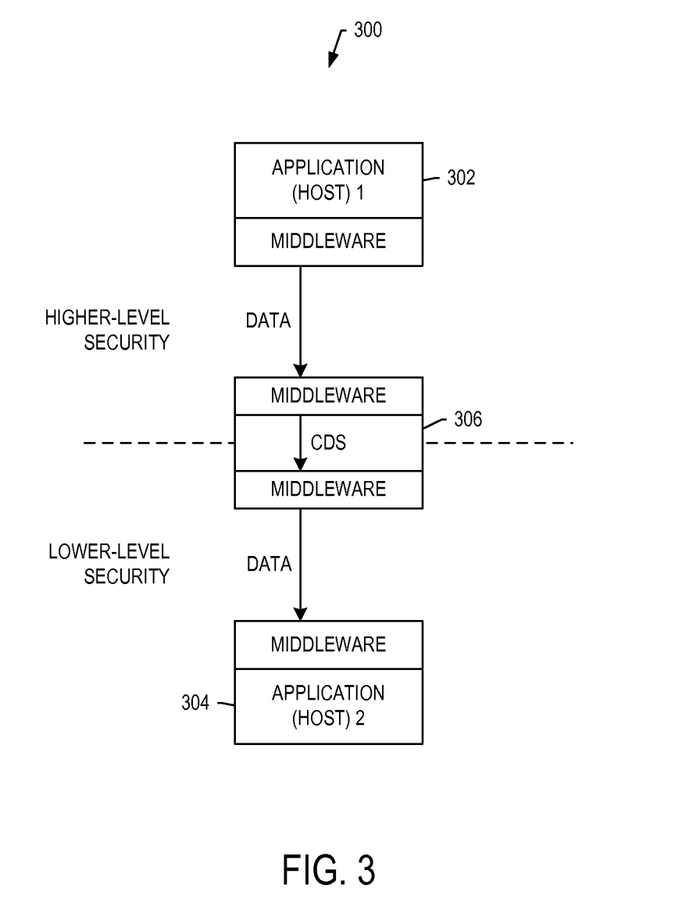
FIGS. 3, 4, 5 and 6 illustrate example scenarios of the flow of data for various quality-of-service profiles according to example implementations of the present disclosure.

FIG. 3 illustrates a best-effort, flow-down scenario 300 in which a first host 302 of a first stack/partition at a first security level and publishes data subscribed to by a second host 304 of a second stack/partition at a second security level that may be lower than the first security level. As also shown, a CDS 306 may be interposed in the communication path between the first and second hosts, and may include middleware proxy functionality between the hosts. In this scenario, the first host may publish data on a given topic using an appropriate multicast address that may include the appropriate domain ID, logical-partition ID assigned to the first security level, and topic ID assigned to the given topic.

The data published by the first host 302 may be inaccessible by the second host 304 due to its lower security level, although the second host may be subscribed to the given topic at its lower, second security level. Instead, the CDS 306 may be subscribed to the given topic at the first security level as a proxy on behalf of the second host. The CDS may therefore receive and filter the data according to an appropriate MAC information flow policy to produce filtered data at the second security level. The CDS may then republish the filtered data to which the second host may be subscribed. The filtered data may be republished using an appropriate multicast address that includes the domain and topic IDs as before, but now including the logical-partition ID assigned to the second security level instead of that assigned to the first security level.

Figure 4:
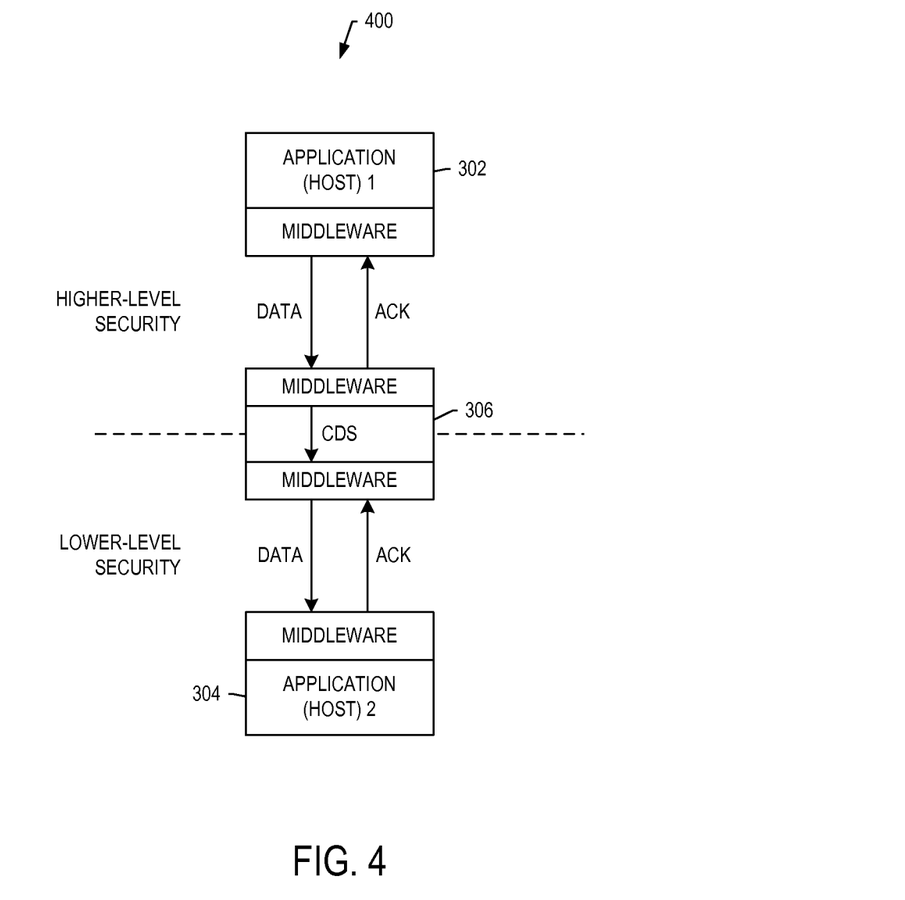

FIG. 4 illustrates a reliable flow-down scenario 400 that may be similar to the best-effort, flow-down scenario 300 in that the first host 302 may publish data on a given topic using an appropriate multicast address to which the CDS 306 may be subscribed as a proxy on behalf of the second host. In contrast to the best-effort scenario, however, the CDS may return an acknowledgement back to the first host in response to its receipt of the data, such as in the form of an appropriate unicast packet. The CDS may filter the data at the first security level to produce filtered data at the second security level, and republish the filtered data for receipt by the second host 304 subscribed thereto. Similar to the CDS and the first host, the second host may return an acknowledgement back to the CDS upon receipt of the filtered data.

Figure 5:
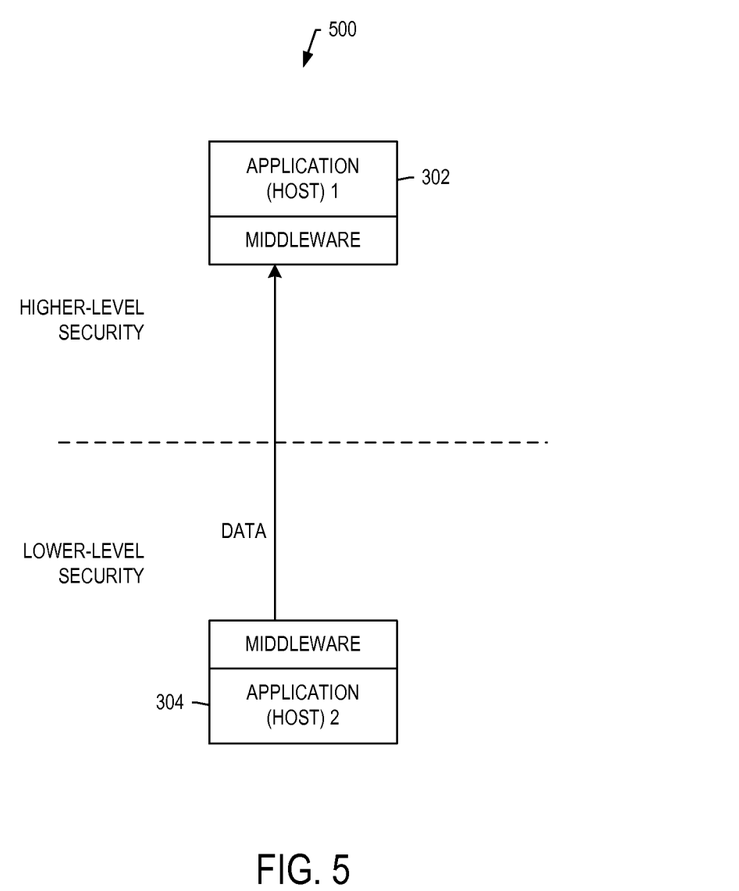

FIG. 5 illustrates a best-effort, flow-up scenario 500 similar to FIG. 3 but in which the second host 304 publishes data on a given topic subscribed to by the first host 302. In this scenario, the data may simply flow from the second host to the first host according to the appropriate MAC information flow policy, and without intervention by the CDS 306. The second host may publish data on the given topic using an appropriate multicast address that may include the appropriate domain ID, logical-partition ID assigned to the second security level, and topic ID assigned to the given topic. This scenario may also function in instances in which the first and second hosts are at the same security level.

Figure 6:
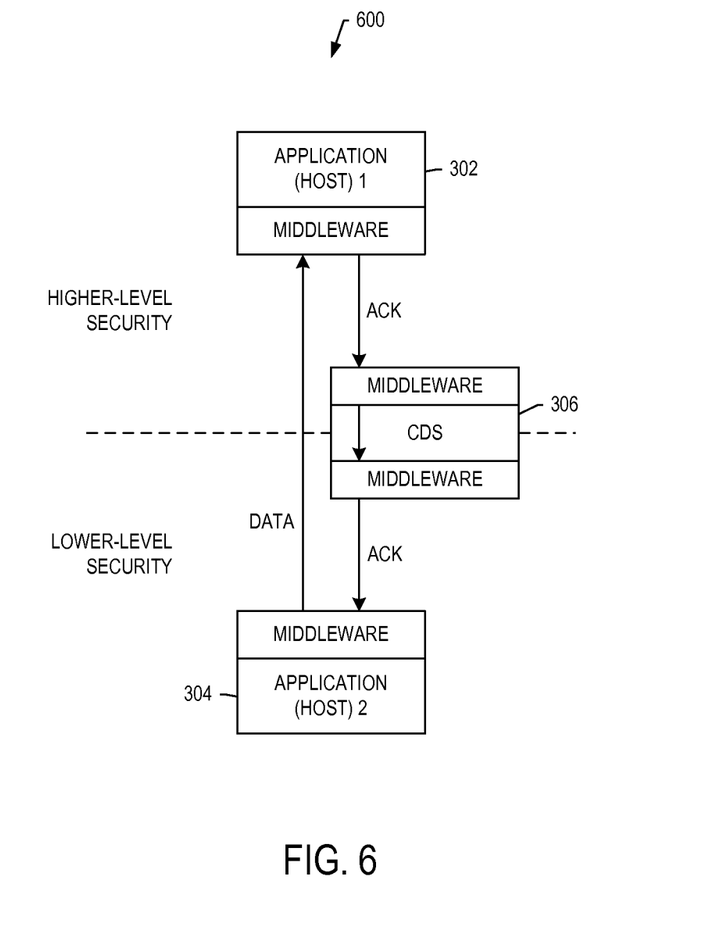

FIG. 6 illustrates a reliable, flow-up scenario 600 in which the second host 304 publishes data on a given topic subscribed to by the first host 302. In this scenario, the data may flow from the second host to the first host similar to the best-effort, flow-up scenario 500. For reliable communication, however, the first host may return an acknowledgement, which middleware (or its manager) at the first host may intercept and publish as a separate topic using an appropriate multicast address. In this regard, the acknowledgement may be published using a multicast address including the appropriate domain ID, logical-partition ID assigned to the first security level, and topic ID assigned to an acknowledgement.

Similar to the scenario 300 of FIG. 3, in the scenario 600 of FIG. 6, the acknowledgement published by the first host 302 may be inaccessible by the second host 304 due to the lower security level of the second host. Instead, the CDS 306 may be subscribed to an acknowledgement at the first security level as a proxy on behalf of the second host. The CDS, then, may receive and filter the acknowledgement according to an appropriate MAC information flow policy to produce a filtered acknowledgement at the second security level. The CDS may then republish the filtered acknowledgement to which the second host may be subscribed. The filtered acknowledgement may be republished using an appropriate multicast address that includes the domain and topic IDs as before, but now including the logical-partition ID assigned to the second security level instead of that assigned to the first security level.

Figure 7:
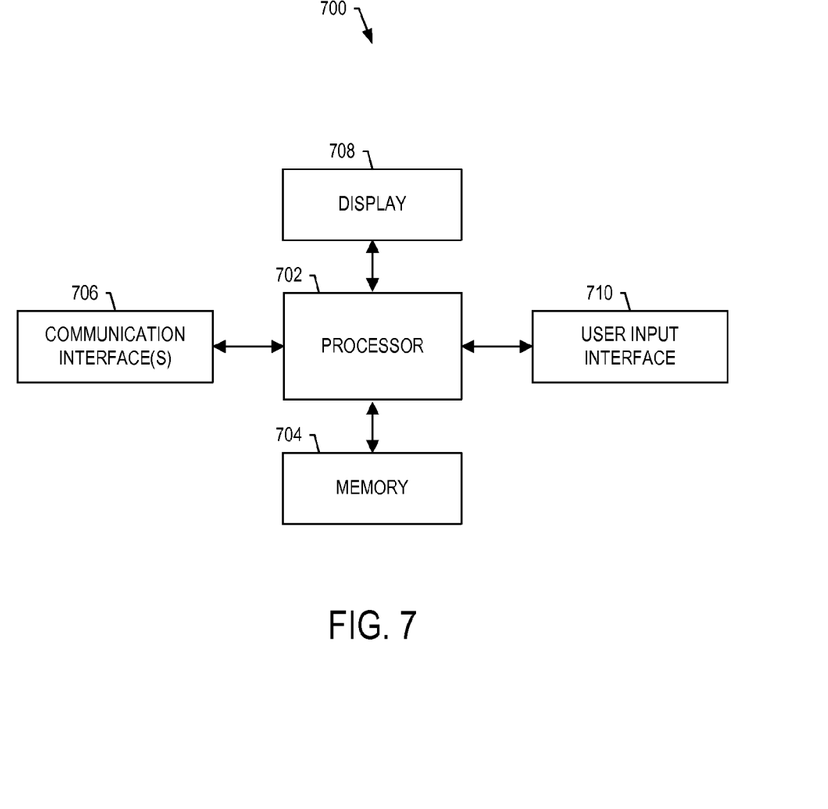
FIG. 7 illustrates an apparatus according to example implementations of the present disclosure.

According to example implementations of the present disclosure, the computer systems 102 and network 104 including MLS switches 118 may be implemented by various means including hardware, alone or under direction of one or more computer program code instructions, program instructions or executable computer-readable program code instructions (at times generally referred to as "computer programs," "software," "firmware" or the like) from a computer-readable storage medium. FIG. 7 illustrates an apparatus 700, which in various example implementations may be configured to function as a computer system and/or MLS switch.

The apparatus 700 of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. As shown, the apparatus may include one or more of each of a number of components such as, for example, a processor 702 (e.g., processor unit) connected to a memory 704 (e.g., memory device, persistent storage).

The processor 702 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory (of the same or another apparatus).

The processor 702 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 704 is generally any piece of computer hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory 704, the processor 702 may also be connected to one or more interfaces for displaying, transmitting and/or receiving information. The interfaces may include one or more communications interfaces 706 such as MLS NICs and/or one or more user interfaces. The communications interface may be configured to transmit and/or receive information, such as to and/or from other apparatus(es), network(s) or the like. The communications interface may be configured to transmit and/or receive information by physical (wire) and/or wireless communications links. Examples of suitable communications interfaces include the aforementioned NIC, which may be wired or wireless (WNIC).

The user interfaces may include a display 708 and/or one or more user input interfaces 710 (e.g., input/output unit), although in some examples the apparatus 700 may not include a display or user input interface such as may be the case for a MLS switch 118. The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory 704 (computer-readable storage medium), and executed by a processor 702, to implement functions of the apparatus 700 described herein. As will be appreciated, any suitable program code instructions may be loaded onto the apparatus from memory to produce a particular machine, such that the particular machine becomes a means for implementing the functions specified herein. These program code instructions may also be stored in memory that can direct the apparatus or processor 702 to function in a particular manner to thereby generate a particular machine or particular article of manufacture. The instructions stored in memory may produce an article of manufacture, where the article of manufacture becomes a means for implementing functions described herein. The program code instructions may be retrieved from memory and loaded into the apparatus or processor to configure the apparatus or processor to execute operations to be performed on or by the apparatus or processor.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together.

Execution of the program code instructions may produce a computer-implemented process such that the instructions executed by the apparatus 700 or processor 702 provide operations for implementing functions described herein.

Execution of instructions by the processor 702, or storage of instructions in memory 704, supports combinations of operations for performing the specified functions. It will also be understood that one or more functions, and combinations of functions, may be implemented by special purpose hardware-based apparatuses and/or processors which perform the specified functions, or combinations of special purpose hardware and program code instructions.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A network-communication system comprising: a plurality of computer systems each of which is configured to operate in accordance with at least one protocol stack assigned to a security level of a multilevel security model, wherein each computer system includes a processor and non-transitory computer-readable storage medium having computer-readable program code stored therein that, in response to execution by the processor, causes the computer system to at least:

perform address discovery or registration for one or more network-layer addresses with a network for an exchange of data between hosts provided by protocol stacks at respective security levels of the multilevel security model; and exchange data between the hosts, the data being accessible or inaccessible by the hosts according to the respective security levels and one or more mandatory access control information flow policies consistent with the multilevel security model, wherein the address discovery or registration is performed using a network management protocol that is trusted and accessible by the hosts without regard to the respective security levels and one or more mandatory access control information flow policies;

wherein protocol stacks of the computer systems are configured to provide respective ones of a first host at a first security level, a second host at a second security level that is lower than the first security level, and one of the computer systems is configured to function as a cross-domain solution (CDS), wherein the first host is configured to publish to the network, data on a given topic that is subscribed to by the second host, the data at the first security level being inaccessible by the second host according to the multilevel security model, and wherein the CDS is subscribed to the data as a proxy for the second host, and the CDS is configured to filter the data to produce filtered data at the second security level, and republish the filtered data to the network for receipt by the second host, the data being published to the network or filtered data being republished to the network using the one or more network-layer addresses.

2. The network-communication system of claim 1, wherein each computer system is further configured to at least:

receive a domain identifier, logical-partition identifiers and topic identifiers for respective ones of a domain, logical partitions of the domain and topics of data for communication in the network, each of the logical partitions being assigned to a respective security level of the multilevel security model; and generate one or more multicast addresses each of which includes the domain identifier and a unique combination of logical-partition identifier and topic identifier, wherein each computer system being configured to perform address discovery or registration includes each computer system being configured to register the one or more multicast addresses with the network.

3. The network-communication system of claim 1, wherein the CDS is configured to return an acknowledgement to the first host in response to the CDS receiving the data, and receive an acknowledgement from the second host at the CDS in response to the second host receiving the filtered data.

4. The network-communication system of claim 1, wherein protocol stacks of the computer systems are configured to provide respective ones of a second host at a second security level, and a first host at a first security level that is equal to or higher than the second security level, and wherein the second host is configured to publish to the network, data on a given topic that is subscribed to by the first host, the data at the second security level being accessible by the first host according to the multilevel security model.

5. The network-communication system of claim 1, wherein protocol stacks of the computer systems are configured to provide respective ones of a first host at a first security level, a second host at a second security level that is lower than the first security level, and one of the computer systems is configured to function as a cross-domain solution (CDS), wherein the first host is configured to publish to the network, an acknowledgement in response to the first host receiving data on a given topic published to the network by the second host, the acknowledgement at the first security level being inaccessible by the second host according to the multilevel security model, and wherein the CDS is subscribed to the acknowledgement as a proxy for the second host, and the CDS is configured to filter the acknowledgement to produce a filtered acknowledgement at the second security level, and republish the filtered acknowledgement to the network for receipt by the second host, the acknowledgement being published to the network or filtered acknowledgement being republished to the network using the one or more network-layer addresses.

6. An apparatus of a plurality of apparatuses each of which is configured to operate in accordance with at least one protocol stack assigned to a security level of a multilevel security model, the apparatus comprising:
  a processor; and
  a computer-readable storage medium coupled to the processor, that is non-transitory and has computer-readable program code stored therein that, in response to execution by the processor, causes the apparatus to at least:
  perform address discovery or registration for one or more network-layer addresses with a network for an exchange of data between hosts provided by protocol stacks at respective security levels of the multilevel security model; and
  exchange data between the hosts, the data being accessible or inaccessible by the hosts according to the respective security levels and one or more mandatory access control information flow policies consistent with the multilevel security model,
  wherein the address discovery or registration is performed using a network management protocol that is trusted and accessible by the hosts without regard to the respective security levels and one or more mandatory access control information flow policies;
  wherein the computer-readable storage medium has further computer-readable program code stored therein that, in response to execution by the processor, causes the apparatus to further:
  receive data on a given topic published to the network by a first host at a first security level, and subscribed to by a second host at a second security level that is lower than the first security level, the data at the first security level being inaccessible by the second host according to the multilevel security model; and at the apparatus configured to function as a cross-domain solution (CDS) subscribed to the data as a proxy for the second host,
  filter the data to produce filtered data at the second security level; and
  republish the filtered data to the network for receipt by the second host, the data being published to the network or filtered data being republished to the network using the one or more network-layer addresses.

7. The apparatus of claim 6, wherein the computer-readable storage medium has further computer-readable program code stored therein that, in response to execution by the processor, causes the apparatus to further:
  receive a domain identifier, logical-partition identifiers and topic identifiers for respective ones of a domain, logical partitions of the domain and topics of data for communication in the network, each of the logical partitions being assigned to a respective security level of the multilevel security model; and
  generate one or more multicast addresses each of which includes the domain identifier and a unique combination of logical-partition identifier and topic identifier,
  wherein the apparatus being caused to perform address discovery or registration includes the apparatus being caused to register the one or more multicast addresses with the network.

8. The apparatus of claim 6, wherein the computer-readable storage medium has further computer-readable program code stored therein that, in response to execution by the processor, causes the apparatus to further:
  return an acknowledgement from the CDS to the first host in response to the CDS receiving the data; and
  receive an acknowledgement from the second host at the CDS in response to the second host receiving the filtered data.

9. The apparatus of claim 7, wherein the computer-readable storage medium has further computer-readable program code stored therein that, in response to execution by the processor, causes the apparatus to further:
  receive data on a given topic published to the network by a second host at a second security level, and subscribed to by a first host at a first security level that is equal to or higher than the second security level, the data at the second security level being accessible by the first host according to the multilevel security model.

10. The apparatus of claim 7, wherein the computer-readable storage medium has further computer-readable program code stored therein that, in response to execution by the processor, causes the apparatus to further:
  receive an acknowledgement published to the network by a first host at a first security level, the acknowledgement being in response to the first host receiving data on a given topic published to the network by a second host at a second security level that is lower than the first security level, the acknowledgement at the first security level being inaccessible by the second host according to the multilevel security model; and at the apparatus configured to function as a cross-domain solution (CDS) subscribed to the acknowledgement as a proxy for the second host,
  filter the acknowledgement to produce a filtered acknowledgement at the second security level; and
  republish the filtered acknowledgement to the network for receipt by the second host, the acknowledgement being published to the network or filtered acknowledgement being republished to the network using the one or more network-layer addresses.

11. A method for a computer system of a plurality of computer systems each of which is configured to operate in accordance with at least one protocol stack assigned to a security level of a multilevel security model, the method comprising:
  performing address discovery or registration for one or more network-layer addresses with a network for an exchange of data between hosts provided by protocol stacks at respective security levels of the multilevel security model; and
  exchanging data between the hosts, the data being accessible or inaccessible by the hosts according to the respective security levels and one or more mandatory access control information flow policies consistent with the multilevel security model,
  wherein the address discovery or registration is performed using a network management protocol that is trusted and accessible by the hosts without regard to the respective security levels and one or more mandatory access control information flow policies;
  receiving data on a given topic published to the network by a first host at a first security level, and subscribed to by a second host at a second security level that is lower than the first security level, the data at the first security level being inaccessible by the second host according to the multilevel security model; and at a cross-domain solution (CDS) subscribed to the data as a proxy for the second host,
  filtering the data to produce filtered data at the second security level; and
  republishing the filtered data to the network for receipt by the second host, the data being published to the network or filtered data being republished to the network using the one or more network-layer addresses.

12. The method of claim 11 further comprising:
receiving a domain identifier, logical-partition identifiers and topic identifiers for respective ones of a domain, logical partitions of the domain and topics of data for communication in the network, each of the logical partitions being assigned to a respective security level of the multilevel security model; and
generating one or more multicast addresses each of which includes the domain identifier and a unique combination of logical-partition identifier and topic identifier,
wherein performing address discovery or registration includes registering the one or more multicast addresses with the network.

13. The method of claim 11 further comprising:
returning an acknowledgement from the CDS to the first host in response to the CDS receiving the data; and
receiving an acknowledgement from the second host at the CDS in response to the second host receiving the filtered data.

14. The method of claim 11 further comprising:
receiving data on a given topic published to the network by a second host at a second security level, and subscribed to by a first host at a first security level that is equal to or higher than the second security level, the data at the second security level being accessible by the first host according to the multilevel security model.

15. The method of claim 11 further comprising:
receiving an acknowledgement published to the network by a first host at a first security level, the acknowledgement being in response to the first host receiving data on a given topic published to the network by a second host at a second security level that is lower than the first security level, the acknowledgement at the first security level being inaccessible by the second host according to the multilevel security model; and at a cross-domain solution (CDS) subscribed to the acknowledgement as a proxy for the second host,
filtering the acknowledgement to produce a filtered acknowledgement at the second security level; and
republishing the filtered acknowledgement to the network for receipt by the second host, the acknowledgement being published to the network or filtered acknowledgement being republished to the network using the one or more network-layer addresses.

\* \* \* \* \*